United States Patent [19]  [11] 4,274,091
Decker  [45] Jun. 16, 1981

[54] ROAD SURFACE ICE DETECTOR AND METHOD FOR VEHICLES

[76] Inventor: Peter W. Decker, Sausenheimer Str. 29, 6718 Grunstadt 1, Fed. Rep. of Germany

[21] Appl. No.: 4,173

[22] Filed: Jan. 17, 1979

Related U.S. Application Data

[63] Continuation-in-part of Ser. No. 884,908, Mar. 9, 1978, abandoned.

[51] Int. Cl.³ .......................... G01J 3/34; G08B 21/00
[52] U.S. Cl. ..................................... 340/583; 250/339; 250/341; 307/10 R; 340/22; 340/32; 340/52 R
[58] Field of Search ................... 340/580, 583, 22, 32, 340/52 R, 53, 57; 307/10 R; 250/339, 340, 341; 180/98, 103 R, 167, 169

[56] References Cited

U.S. PATENT DOCUMENTS

| | | | |
|---|---|---|---|
| 2,074,251 | 3/1937 | Braun | 340/52 R |
| 2,816,233 | 12/1957 | Krueger | 250/339 X |
| 3,045,223 | 7/1962 | Kapany et al. | 340/583 |
| 3,201,750 | 8/1965 | Morin | 340/52 R |
| 3,471,698 | 10/1969 | Mausteller et al. | 250/339 X |
| 3,540,025 | 11/1970 | Levin et al. | 340/583 X |
| 3,735,136 | 5/1973 | Flint | 250/339 |

Primary Examiner—John W. Caldwell, Sr.
Assistant Examiner—Joseph E. Nowicki

[57] ABSTRACT

Method and apparatus for detecting from vehicles the presence of ice on roads comprising means for generating a light pulse train whose amplitude is modulated in the presence of ice on the travelling surface, means for detecting modulation of the pulse train, and means for generating an indicating signal when a modulating signal is detected.

11 Claims, 3 Drawing Figures

ROAD SURFACE ICE DETECTOR AND METHOD FOR VEHICLES

CROSS REFERENCES TO RELATED APPLICATIONS

This patent application is a continuation-in-part of United States Patent Application Ser. No. 884,908 filed Mar. 9, 1978 now abandoned, and claims priority with respect to the common subject matter to German Patent Application No. P 27 12 199.9 filed Mar. 19, 1977.

FIELD OF THE INVENTION

This invention relates to a new and improved method and apparatus for detecting from vehicles the presence of ice on traveling surfaces and for providing an indication to caution drivers when the road surface is glazed with ice.

BACKGROUND OF THE INVENTION AND PRIOR ART STATEMENT

Known devices of this kind, for example, as shown in German Disclosure Specification DT-OS No. 1,906,330 and Deutsches Gebrauchsmuster DT-GM No. 7,218,872 ascertain the temperature of the road surface, or the temperature near the road surface, and also the relative humidity of the air, in order to draw from these values conclusions as to the possibility of the formation of glazed ice. The disadvantage of these systems is that they do not provide an indication as to whether the road is actually slippery. What is indicated is only that the conditions for sleet formation are given. Other known devices of this kind as set forth in German Disclosure Specification DT-OS No. 1,936,255 and DT-OS No. 2,229,386 employ an element mounted on the vehicle and in contact with the road surface for response to changes in the adhesion to the road surface. There is used, for example, a slide shoe held by a holding arm in contact with the roadway surface, the pulling force produced by the friction of the slide shoe on the road surface being measured and used as a measure for the adhesion between the surfaces of the slide shoe and the road surface. It is also a known practice to employ a roller or drag wheel being used as a measure of adhesion between the road and the drag wheel. The disadvantages of these known devices is that a road-engaging part in the form of a slide shoe or a drag wheel is required.

Still other known devices for determining the presence of glazed ice (see German Disclosure Specification DT-OS No. 2,416,623) take advantage of the difference in the rotary speed of a driven and a non-driven wheel. Such devices depend on the fact that the slippage between a wheel and the roadway is, in the case of a driven wheel of an automobile, always at least somewhat greater than for a non-driven, freely rolling wheel, and the fact that this slippage will become greater with increasing road slipperiness in a considerably higher degree on a driven or braked wheel than on a freely rolling wheel. A disadvantage of this arrangement is that the static radius of the wheels may vary with the wear, the air pressure and the load and may, therefore, necessitate frequent calibration. Torques of different values, depending upon the drive gear also influence the difference in the rotary speed, independently of road glaziness. A further disadvantage of such a device is the fact that, independently of road glaziness, differences in the rotary speed occur also when the wheels negotiate a curve.

U.S. Pat. No. 2,849,701 describes a highway condition indicating system comprising road signs mounted along the highway to signal the presence of weather conditions detected by stationary sensors. Such a system is not adapted for mounting on vehicles themselves to caution the vehicle of dangerous ice conditions wherever it travels.

SUMMARY OF THE INVENTION

It is an object of the present invention to provide in a simple manner a device of the kind indicated at the beginning that avoids the disadvantages of the constructions known so far.

According to the invention, this problem is solved by radiating light of a defined wave length upon the roadway surface, by transforming the light reflected from there into an electrical signal in a receiver, and by making the electrical signal produced during ice formation on the roadway noticeable to the driver by means of a warning device. Preferably the device is attached directly to the underside of the vehicle.

In this device, advantage is taken of the fact that the absorption bands of ice are slightly different from those of water and water vapor. It is thus possible, even in the case of a wet roadway, to recognize exactly the moment when ice begins to form.

The absorption bands of ice lie prevailingly at about 0.79 to 0.81 microns, at about 0.89 to 0.92 microns, at about 1.29 to 1.06 microns, and at about 1.26 to 1.29 microns, whereas those of water, when compared according to the above sequence, lie at about 0.74 microns, about 0.84 microns, about 0.97 microns, and about 1.17 microns. Further wave lengths lie at about 1.43 microns, about 1.94 microns, about 2.95 microns, about 4.78 microns, and about 6.1 microns.

The light pulses of a chosen absorption wave length of ice radiated upon the roadway will, if glazed ice is present on the roadway, be absorbed and will produce in a receiver a voltage or current threshold value, which is passed to the input of an indicating or warning device. It would likewise be conceivable to direct light pulses of an absorption wave length of water or water vapor onto the roadway, which light pulses will then pass undamped into the receiver in the case of ice formation and will produce a signal difference as compared with the wet roadway. This signal difference would also be indicated by a warning device. The light pulses, which must be of a very small band width, are preferably produced by a pulsed laser diode, which is disposed, together with the receiver, at a safe distance from the road surface.

For increasing the sensitivity, the light pulses may be transmitted via infrared-light conductors into the vicinity of the roadway surface and may be returned from there via infrared-light conductors into the receiver.

More particularly, the present invention contemplates apparatus and methods for detecting from vehicles the presence of ice on traveling surfaces comprising generating a train of light pulses from light originating from the vehicle and reflected from the traveling surface for return to the vehicle for detecting and processing, said light pulse train to comprise interleaved measurement pulses and reference pulses, said measurement pulses comprising frequencies in at least one absorption band for ice and said reference pulses comprising frequencies outside the absorption bands of ice. According to the invention, further steps include detecting at the vehicle said light pulse train and generating electrical signal pulses corresponding in amplitude to the detected light pulses thereby providing interleaved measurement and reference electrical signal pulses; dividing said generated electrical signal pulse train along first and second parallel electrical paths; deriving a mean value voltage signal from the amplitude of the pulses of the electrical signal pulse train along said first path; adjusting the amplitude of the pulses in said second path to equal or not exceed the mean value voltage derived in the first path with no ice on the traveling surface when the measuring and reference pulses are substantially equal; and comparing the amplitude of signals in the first and second paths for generating output pulses when each reference pulse in the second path exceeds the mean value voltage in the first path by a threshold difference.

From a more general perspective the invention contemplates the method and apparatus for generating a light pulse train and modulating the amplitude of the pulse train in the presence of road ice, detecting the presence of such a modulating signal on the pulse train, and generating an indication signal when a modulating signal is detected. According to the invention, the light pulse train is constructed so that it will be subject to pulse amplitude modulation in the presence of road ice, and a corresponding electrical signal is then induced for further processing. A feature and advantage of the invention is that detection of pulse modulation can be used to generate a signal for energizing an indicator, cautioning the driver of the presence of glazed ice on the road wherever the vehicle travels.

Other objects, features and advantages will become apparent in the following specification and accompanying drawings.

DESCRIPTION OF THE PREFERRED EMBODIMENT

Figure 1:
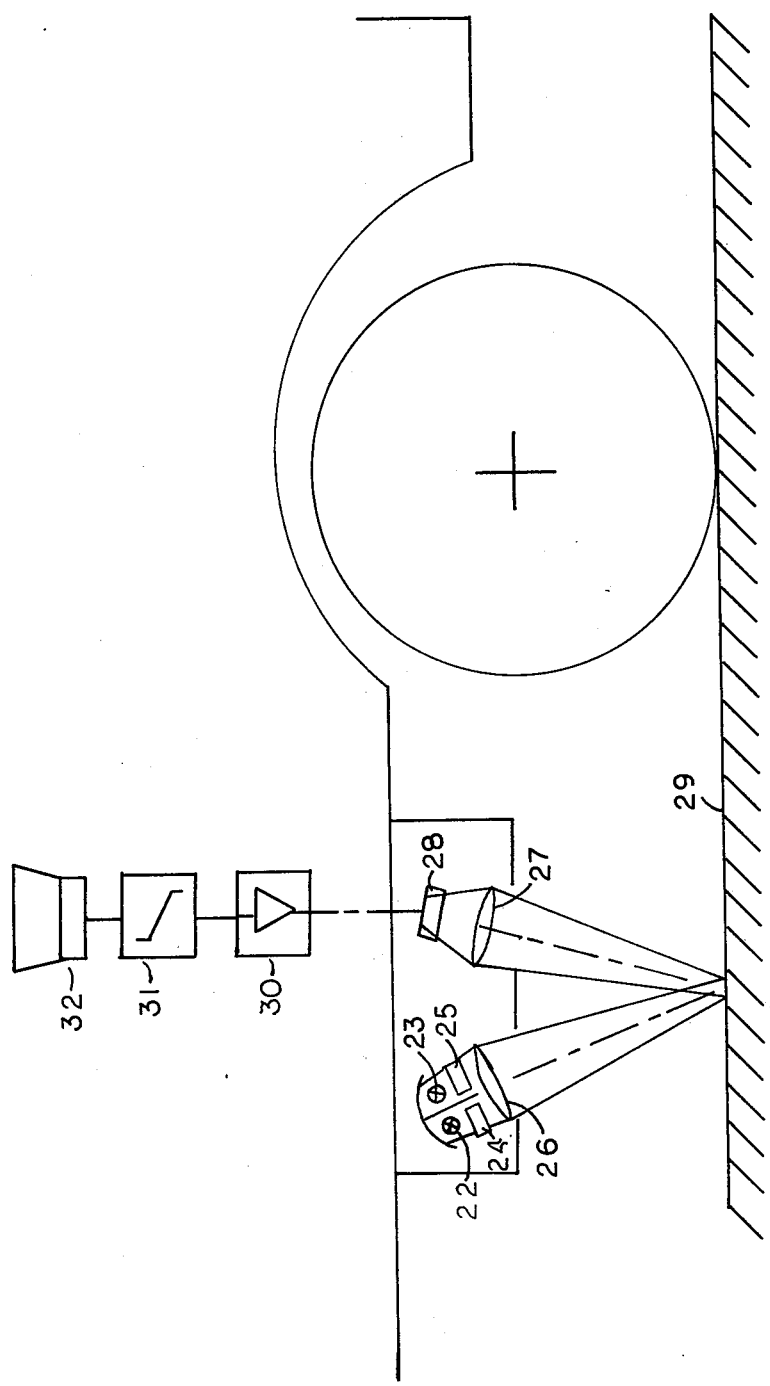
FIG. 1 is a simplified diagrammatic view of components arranged on a vehicle for detecting and indicating the presence of road surface ice in accordance with the present invention.

In the following, an exemplary embodiment of the invention will be explained in detail in conjunction with a schematic drawing, FIG. 1. It shows the chassis 21 of an automobile with the amplifier 30 necessary for the device, a threshold discriminator 31 (Schmitt trigger) and an acoustic warning device 32. The device comprises the sources of light 22 and 23, from which in pulsed operation, rays of light, focused by a condenser lens 26, are directed through the filters 24 and 25 in time sequence onto the roadway surface 29. A diffusely remitted portion of the radiation is focused by a condenser lens 27 and is passed to a photocell 28, from where it is electrically "processed" via an amplifier 30 and a threshold discriminator 31 (Schmitt trigger), to be indicated by an acoustic warning device 32. While the source of light 22, in connection with the filter 24, emits the measuring light pulses, the source of light 23 with filter 25 directs in time sequence reference radiation pulses onto the roadway surface. The light pulses are produced by appropriate control of the laser diodes 22 and 23 serving as source of light.

The source of light 22 and 23, the filters 24 and 25, the lenses 26 and 27 and the photocell 28 are accommodated in a common housing 33.

The device constructed in accordance with the invention has the important advantage that it indicates only actually existing glazed ice on the road at all operation conditions of the vehicle. The cost of construction and operation is extremely small.

In accordance with the arrangement of the invention illustrated in FIG. 1 two light sources 22 and 23 are provided each with its corresponding filters 24 and 25. One of the filter, for example 24, is selected to pass light from source 22 primarily in the frequencies of the absorption bands of ice. Filter 25, on the other hand would be selected to pass light from source 23 primarily in frequencies outside the absorption band of ice. The light sources 22 and 23 themselves may be selected to emit primarily only the desired frequencies by using laser diodes or light emitting diodes which provide high selectivity in the frequency of light emission and which are available over a range of convenient frequencies for example in the infrared and visible spectra as described in U.S. Pat. No. 3,910,701.

Light sources 22 and 23 are pulsed in a timed sequence so that the pulses are interleaved in time for example, alternately, providing a light pulse train of measurement pulses originating from light source 22 and filter 24 in the frequency absorption bands of ice, and reference pulses originating from light source 23 and filter 25 outside the frequency absorption bands of ice. The light pulse train directed on the road surface through condensor lens 26 is reflected back and concentrated by lens 27 onto a photocell detector 28. The detector 28 generates an electrical signal pulse train of interleaved measurement and reference signal pulses corresponding in amplitude to the light pulse train received from the road surface. This electrical pulse signal of measurement and reference pulses is further processed through the amplifier and threshold discriminator to a visual or acoustic warning indicator as described in further detail with reference to FIGS. 2 and 3.

Figure 2:
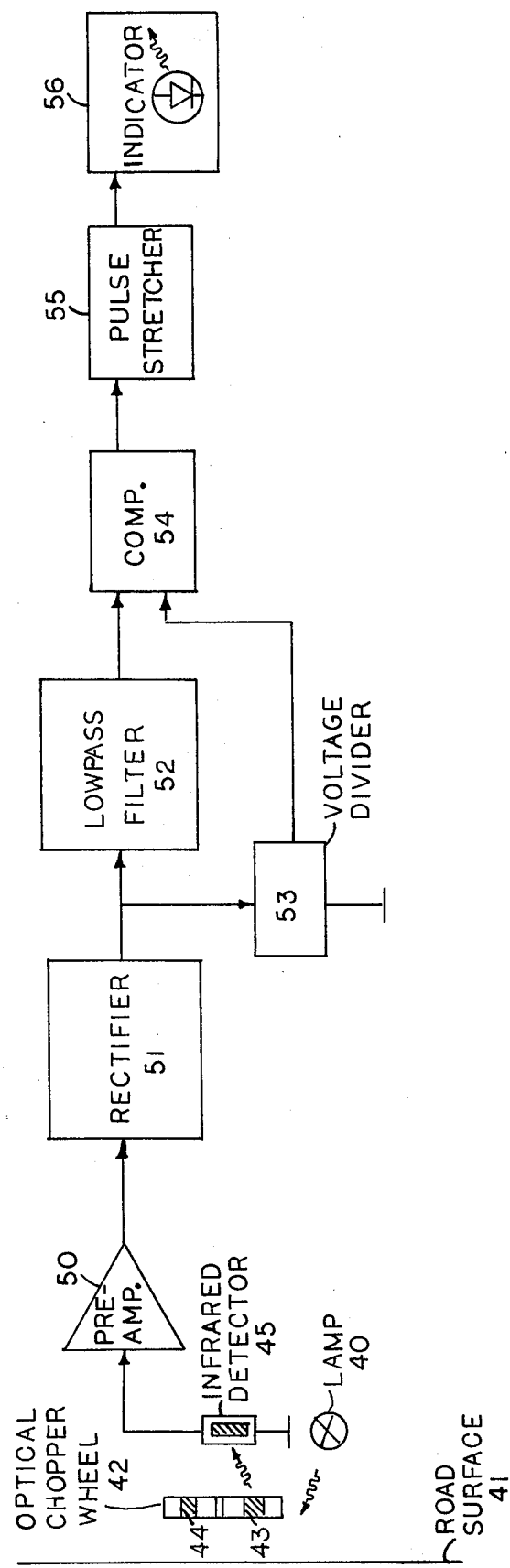
FIG. 2 is a block diagram of another road surface icedetecting and indicating system in accordance with the present invention.

In the embodiment of the invention illustrated in FIG. 2 a single light source 40 such as an infrared light source is mounted on the vehicle. Light reflected from the road surface 41 follows a return path through optical chopper wheel 42 also mounted on the vehicle. The chopper wheel is constructed with two filters 43 and 44 which alternately fall in the reflected light path as the chopper wheel rotates. The filters are selected so that, for example filter 43 passes frequencies in the absorption bands of ice to provide measurement light pulses while filter 44 passes frequencies outside the absorption bands of ice to provide the reference light pulses sequenced between the measurement pulses. Infrared detector 45 detects the train of interleaved measurement light pulses and reference light pulses to generate a corresponding electrical pulse train signal of corresponding amplitudes.

Further processing circuitry for the generated electrical signal follows the block diagram and includes an amplifier 50 and rectifier 51 which provide a suitable amplitude and stable baseline for the pulse train and the following DC circuit. The signal is then divided along two paths, the first including low pass filter 52 which derives a mean value voltage from the amplitudes of the measuring and reference pulses whose amplitudes differ in the presence of ice. Voltage divider 53 directs a signal along a second parallel path and is adjustable so that the pulses in the second path can be attenuated not to exceed the mean value derived by the low pass filter 52 in the case of no ice on the traveling surface. With no ice on the road the measuring and reference pulse amplitudes continue to maintain their original relationship however the relative equality or constancy is modulated in the presence of ice glazed on the road surface.

Thus, in the absence of ice, comparator 54 yields no output because of the relative equality of the signals at the input to the comparator along the first and second paths. In the presence of road ice the measuring light pulses and corresponding electrical pulses are attenuated and the consequent decrease in measuring pulse amplitude lowers the mean value voltage derived by low pass filter 52. However, the reference pulses in the second path from voltage divider 53 retain their original amplitude, remaining nearly constant, thereby exceeding the reduced mean value signals from the low pass filter. The comparator 54 therefor delivers a pulse signal at its output for each reference pulse input from the voltage divider. These comparator pulses are smoothed by pulse stretcher 55 to energize the indicator 56, which might be a visual LED indicator cautioning the driver in the presence of glazed ice on the road surface. Comparator 54 and associated components serve also to introduce a minimum threshold difference before there is sufficient voltage difference to actuate the indicator as illustrated in the more detailed schematic diagram of FIG. 3.

Figure 3:
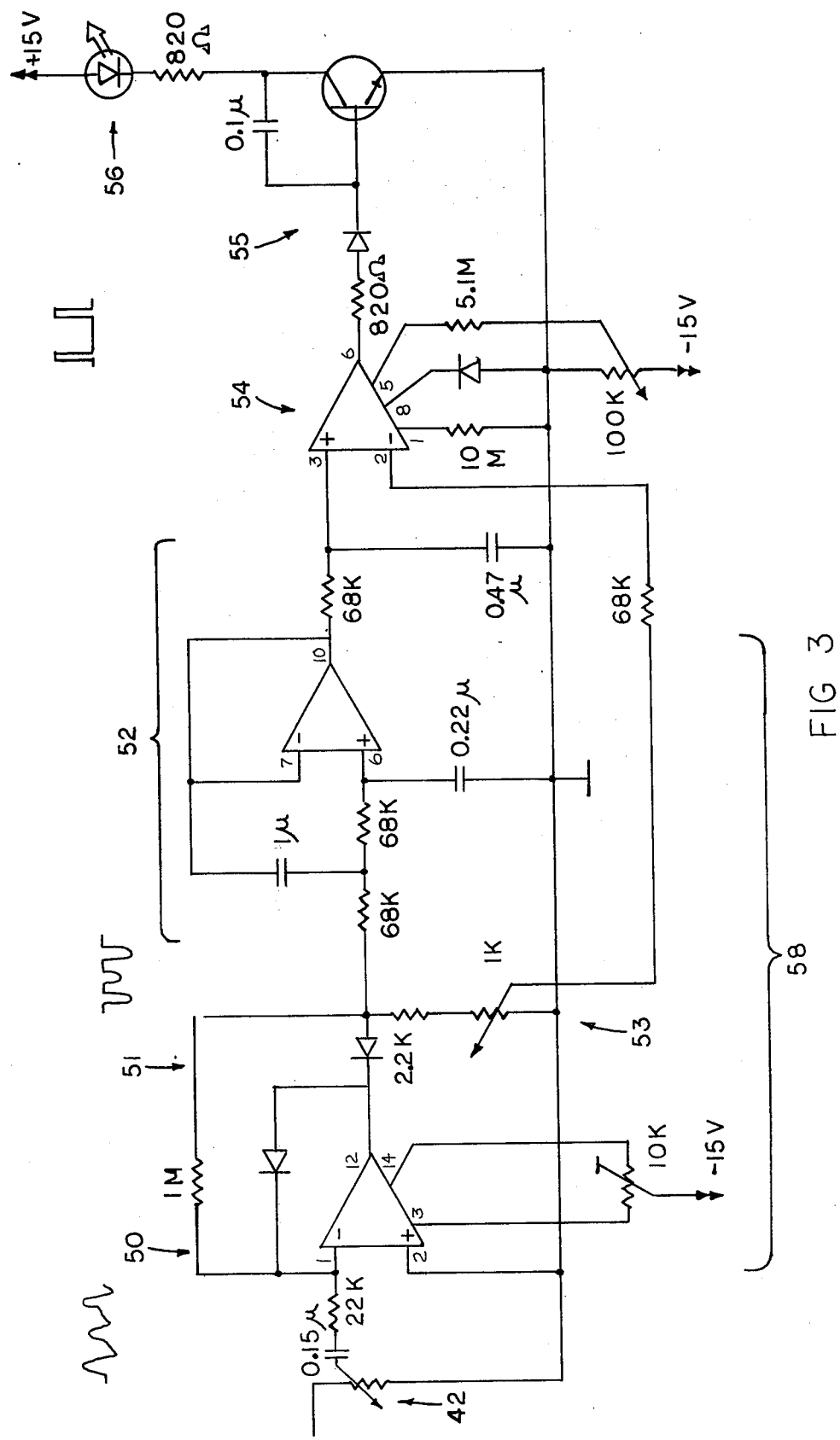
FIG. 3 is a detailed schematic diagram of circuitry for implementing the detecting and indicating system of FIGS. 1 and 2.

FIG. 3 is a detailed schematic diagram of the circuit for processing the train of pulses as described with reference to FIG. 2 with those portions of the circuitry corresponding to the blocks of FIG. 2 similarly numbered. An example of pulse forms through the circuit are indicated above the schematic diagram for the case in which glazed ice is present on the traveling surface so that the measurement pulses are attenuated. Thus, the pulse signals are received by, for example a cadmium selenide variable resistor 42 with alternate measurement pulses attenuated or damped by the presence of ice. This sampling is preamplified and rectified at 50 and 51 to give an inverted absolute value signal with a stable baseline for further processing. The preamplifying operational amplifier includes the 10K balance offset potentiometer and can be part of an integrated circuit as hereafter described. Thus, the preamplifier amplifies the absolute value of the signal with the amplitude of the pulses modulated by the presence of ice on the road.

Impedance divider 53 provides two signals along first and second paths to the comparator 54, one signal filtered by filter 52, and the other signal unfiltered. The filter 52 which derives a mean value voltage from the amplitudes of the measurement and reference pulses is a 3-pole Butterworth filter network including three capacitors and three resistors coupled with the operational amplifier as shown. Portions of the circuit comprising the preamplifier 50 and Butterworth filter 52 and indicated by bracket 58 can be obtained from an integrated circuit, for example the TL083 type where pin couplings are shown by pin numbers at the operational amplifiers. In addition, −15 volts is applied to the number 4 pin and +15 volts applied to pins 9 and 13 of the IC. The TL083 is manufactured by Texas Instruments, Inc.

Similarly, the comparator can be obtained from an integrated circuit of the SG301 type with pin couplings shown by pin numbers at the comparator. In addition, +15 volts is applied to the pin number 7 and −15 volts to pin 4 of such an IC. The SG301 is manufactured by Silicon General, Inc.

The road ice detector and indicator of the present invention thus functions to generate a stream of light pulses whose amplitudes are modulated in the presence of ice. The detector generates an electrical signal corresponding to the modulated pulses and processes the signal to provide an output proportional to the modulation. Thus, from a broader perspective the present invention contemplates generating a light pulse train, modulating the amplitude of the pulses in the presence of road ice, and detecting the modulating signal to actuate an indicator. The output is proportional to the modulation and with no ice there is no modulation and therefor no output from the device. In terms of apparatus, the invention can be viewed as contemplating means for generating a light pulse train whose pulse amplitudes are modulated in the presence of road ice, means for detecting the presence of a modulating signal, and means for generating an indicating signal when a modulating signal is detected.

I claim:

1. A method of detecting from vehicles the presence of ice on traveling surfaces comprising:
    generating a train of light pulses from light originating at the vehicle and reflected from the traveling surface for return to the vehicle for detection, and processing said light pulse train to comprise interleaved measurement light pulses and reference light pulses, said measurement light pulses comprising frequencies in at least one absorption band for ice, and said reference pulses comprising frequencies outside the absorption bands of ice;
    detecting at the vehicle said light pulse train and generating electrical signal pulses corresponding in amplitude to the detected light pulses, thereby providing a train of interleaved measurement and reference electrical signal pulses;
    dividing said generated electrical signal pulse train along first and second parallel electrical paths;
    deriving a mean value voltage signal from the amplitude of the measurement and reference pulses of the electrical signal pulse train along said first path;
    adjusting the amplitude of the pulses in said second path to equal or not exceed the mean value voltage derived in the first path with no ice on the traveling surface when the measuring and reference pulses are substantially unchanged;
    comparing the amplitude of signals in the first and second paths and generating pulses when each reference pulse in the second path exceeds the mean value voltage in the first path by a threshold difference;
    processing said comparison threshold difference indicating pulses for indicating the presence of ice on the traveling surface.

2. A method of detecting from vehicles the presence of ice on traveling surfaces as set forth in claim 1 wherein the step of generating and processing a light pulse train of interleaved measurement and reference light pulses comprises:
    directing a beam of light onto the traveling surface for reflection back to the vehicle, said light including frequencies both inside and outside the absorption bands of ice;

alternately positioning first and second filters in the light beam path, said first filter passing frequencies in the absorption bands of ice, said second filter passing frequencies outside said absorption bands of ice, thereby chopping said light beam to provide measurement and reference pulses of light in sequence for delivery to the detector.

3. A method of detecting from vehicles the presence of ice on traveling surfaces as set forth in claim 1 wherein the step of generating and processing a pulse train of light comprises:

generating light signals from two sources mounted on the vehicle and alternately pulsing said sources in timed sequence to provide two light pulse trains for reflection from the traveling surface;

passing said first light pulse train through a first filter passing frequencies in the absorption bands of ice;

passing said second pulse train through a second filter passing frequencies outside the absorptions bands of ice; and sequencing said first and second light pulse trains to provide a single pulse train of interleaved measurement and reference pulses.

4. A method of detecting from vehicles the presence of ice on roads comprising:

directing pulses of light from the vehicle onto the road surface for reflection back and detection at the vehicle; filtering said pulses of light to provide measuring pulses at one or more frequencies in the absorption bands of ice and reference pulses at frequencies outside the absorption bands;

sequencing said measuring and reference pulses; detecting at the vehicle light pulses reflected from the road surface;

generating electrical pulses corresponding in amplitude to the reflected pulses detected at the vehicle thereby providing corresponding measurement and reference electrical pulses;

rectifying said electrical pulses to provide a stable baseline for the pulse train;

dividing said signal along two paths;

deriving a mean value voltage from the amplitudes of the pulses of the pulse train along said first path;

adjusting the amplitude of the reference pulses in said second path to equal or not exceed the mean value voltage derived in the first path with no ice on the road when the reference and measuring pulse amplitudes are substantially unchanged;

comparing the amplitudes of signals in the first and second paths and generating pulses when each reference pulse in the second path exceeds the mean value voltage in the first path by a threshold difference;

processing said comparison threshold difference indicating pulses for indicating the presence of ice on the road surface.

5. Apparatus for detecting and indicating from vehicles the presence of ice on traveling surfaces comprising:

means mounted on said vehicle for generating a train of light pulses from light originating at the vehicle and reflected from the traveling surface for return and detection at the vehicle, said light pulse train comprising interleaved measurement light pulses and reference light pulses, said measurement pulses comprising frequencies in at least one absorption band for ice and said reference pulses comprising frequencies outside the absorption bands of ice;

means for detecting said light pulse train and generating electrical signal pulses corresponding in amplitude to said interleaved measurement and reference pulses;

voltage dividing means for dividing said generated electrical signal pulse train of measurement and reference pulses along first and second parallel electrical paths; filter means for deriving mean value voltage signals along said first path from the amplitudes of the measurement and reference pulses;

said voltage dividing means adjusting the amplitude of the pulses in said second path to equal or not exceed the mean voltage value derived in said first path with no ice on the traveling surface, and maintaining the electrical refernce signal pulses in the second path at said level;

comparator means for comparing the amplitudes of signals in the first and second paths and for generating a signal when each reference pulse in said second path exceeds the mean voltage in the first path by a threshold value; and indicator means for indicating the presence of ice on the traveling surface in response to threshold difference generated signals.

6. Apparatus for detecting and indicating the presence of ice on a traveling surface as set forth in claim 5 wherein is also provided pulse stretcher means coupled to the output of said comparator means for smoothing the pulse signal from the comparator to energize the indicator means.

7. Apparatus to be mounted on a vehicle for detecting and indicating the presence of ice on traveling surfaces comprising:

light source means mounted on said vehicle and oriented for directing light onto the traveling surface for reflection back to the vehicle;

means for pulsing the light originating from said light source means to provide a train of light pulses;

means for filtering light originating from said light source means further to provide a pulse train of interleaved measurement pulses and reference pulses, said measurement pulses comprising frequencies in at least one absorption band of ice, said reference pulses comprising frequencies outside the absorption bands of ice;

detector means mounted on said vehicle for detecting said pulse train of interleaved measurement and reference pulses and generating an electrical signal pulse train of corresponding amplitude measurement and reference electrical pulses;

voltage divider means for dividing said electrical signal pulse train along first and second electrical paths;

low pass filter means coupled in said first path for deriving mean value voltage signals from the amplitudes of the pulse train of measurement and reference pulses; said voltage divider means adjustable to attenuate the amplitude of pulses in the second path not to exceed the mean value voltage derived in the first path when no ice is on the traveling surface;

comparator means for comparing the amplitudes of signals in the first and second paths and for generating pulses or other signals when each reference pulse in the second path exceeds the mean value voltage derived in the first path; and indicator means energized by comparator pulses to indicate the presence of ice on the traveling surface.

8. Apparatus for detecting the presence of ice on traveling surfaces as set forth in claim 7 wherein said light source means, pulsing means and filter means comprises:

first and second light sources and means for alternately pulsing said sources of light to generate a pulse train of light pulses alternately originating from said first and second light sources;

first and second filter means positioned respectively in the paths of light originating from the first and second light sources, said first filter passing light frequencies in at least one absorption band for ice, said second filter passing light frequencies outside said absorption bands for ice and means for directing said interleaved alternate pulses onto the traveling surface for reflection back to the vehicle.

9. Apparatus for detecting and indicating the presence of ice on a traveling surface as set forth in claim 7 wherein said light source means, pulsing means and filter means comprises:

a single light source mounted on the vehicle directing light onto the traveling surface;

chopper means mounted on the vehicle in the path of light reflected from the traveling surface;

first and second filter means mounted on said chopper means, said chopper means adapted alternately to position said first and second filters in the path of reflected light, said first filter passing frequencies in the absorption bands of ice, said second filter passing frequencies outside the absorption bands for ice;

whereby interleaved measurement and reference pulses are delivered to the detector means.

10. Apparatus to be mounted on a vehicle for detecting and indicating the presence of ice on a traveling surface comprising:

means for generating a light pulse train whose amplitude is modulated in the presence of ice on the traveling surface upon reflection of the light from the traveling surface, said light pulse train including pulses of narrow bandwidth in the absorption bands of ice;

means for detecting the presence of a modulating signal on the pulse train comprising first channel means including filter means for generating a first signal proportional to the mean value of the reflected light pulse train, in both the absence and presence of ice, second channel means including voltage divider means generating a second signal of substantially constant value related to the amplitude of the light pulse train and adjusted to equal or not exceed the value of the first signal in the absence of ice and third means comparing said first and second signals;

whereby when the mean value proportional first signal drops due to the presence of surface ice below the constant value of the second signal beyond a threshold difference, an output signal is provided by said comparing means.

11. A method for detecting from vehicles the presence of ice on roads comprising:

generating a light pulse train including pulses of narrow bandwidth in the absorption bands of ice;

modulating the amplitude of receiving said light pulse train upon reflection of the light from the road surface said light pulse train having an amplitude which is modulated in the presence of road ice;

detecting the presence of a modulating signal in said light pulse train comprising generating a first signal proportional to the mean value of the reflected light pulse train in both the absence and presence of road ice, generating a second signal of substantially constant value related to the amplitude of the pulse train in the absence of road ice, and comparing said first and second signals;

and generating an indicating signal when a modulating signal causes a difference between said first and second signals beyond a selected threshold value.

* * * * *